United States Patent [19]
Back et al.

[11] Patent Number: 5,993,684
[45] Date of Patent: Nov. 30, 1999

[54] COMPOSITION AND METHOD FOR DE-ICING AND ANTI-ICING SURFACES

[75] Inventors: Dwight D. Back, Melbourne; John A. Meyer, Palm Bay; Charlie Ramos, Melbourne, all of Fla.

[73] Assignee: Mainstream Engineering Corporation, Rockledge, Fla.

[21] Appl. No.: 09/071,829

[22] Filed: May 4, 1998

[51] Int. Cl.⁶ ............................... C09K 3/18; C09K 5/00
[52] U.S. Cl. ............................... 252/70; 106/13; 252/73; 252/74
[58] Field of Search ............................... 106/13; 252/70, 252/73, 74

[56] References Cited

U.S. PATENT DOCUMENTS

| | | | |
|---|---|---|---|
| 2,101,472 | 12/1937 | Kormann | 106/13 |
| 2,373,727 | 4/1945 | West et al. | 106/13 |
| 3,362,910 | 1/1968 | Ordelt et al. | 252/75 |
| 3,653,853 | 4/1972 | Rosenwald | 44/419 |
| 4,117,214 | 9/1978 | Parks et al. | 252/70 |
| 4,163,079 | 7/1979 | Beafore | 252/70 |
| 4,439,337 | 3/1984 | Nimerick et al. | 252/70 |
| 4,606,835 | 8/1986 | Lieber et al. | 252/70 |
| 5,484,547 | 1/1996 | Mendoza | 252/73 |
| 5,708,068 | 1/1998 | Carder et al. | 106/13 |
| 5,772,912 | 6/1998 | Lockyer et al. | 252/70 |

FOREIGN PATENT DOCUMENTS

| | | |
|---|---|---|
| WO 87/04450 | 7/1987 | WIPO . |
| WO 96/23043 | 8/1996 | WIPO . |

OTHER PUBLICATIONS

WPIDS Abstract No. 95–320958, abstract of Canadian Patent Specification No. 2139721, Jul. 1995.

*Primary Examiner*—Anthony Green
*Attorney, Agent, or Firm*—Evenson, McKeown, Edwards & Lenahan, P.L.L.C.

[57] ABSTRACT

Method and compositions for reducing or removing ice formation from surfaces where the compositions consist essentially of (i) one or more polyhydric alcohols and (ii) one or more non-potassium, low carbon percentage organic compounds, and optionally one or more non-potassium, non-halide inorganic compounds and/or monohydric alcohols, whereby the freezing point of the composition is depressed.

33 Claims, No Drawings

COMPOSITION AND METHOD FOR DE-ICING AND ANTI-ICING SURFACES

STATEMENT AS TO RIGHTS TO INVENTION MADE UNDER FEDERALLY-SPONSORED RESEARCH AND DEVELOPMENT

The U.S. Government has a paid-up license in this invention and the right in limited circumstances to require the patent owner to license others on reasonable terms as provided for by the terms of contract No. F33615-97-C-5644 awarded by U.S. Air Force, Wright Laboratory (AFMC) Wright-Patterson Air Force Base.

BACKGROUND AND SUMMARY OF THE INVENTION

The present invention generally relates to methods of and compositions for de-icing and anti-icing surfaces, and particularly to methods of and compositions for de-icing and anti-icing which do not rely on glycols as de-icing and anti-icing agents. More specifically, the present invention relates to methods of and compositions for de-icing and anti-icing surfaces using one or more polyhydric alcohols in combination with one or more non-potassium, low carbon percentage organic compounds, and optionally, one or more non-potassium, non-halide inorganic salts and alcohols.

Ice build-up on aircraft wings, runways and roadways is a significant problem. First, ice build-up threatens the safety of travelers by causing or contributing to accidents. Second, ice build-up increases the costs and time delays of travel. These problems are of special concern to the airline industry.

Ice build-up may be removed from surfaces by "de-icing" processes or compositions, or reduced or prevented from forming by "anti-icing" processes or compositions (collectively, "anti-icing"). Anti-icing and, in particular, aircraft anti-icing may be accomplished by (1) mechanical, (2) electrical, or (3) chemical means.

Mechanical methods physically remove ice by directing heat to the surface (e.g., hot-air impingement) or pneumatics (e.g., alternatively inflating and deflating air-filled bags on wings/tail surfaces). Anti-icing technologies include the use of hydrophobic/icephobic substances like chitin/chitosan paints (for airplanes) or silicone polymers (for runways). Electrical methods include heating or electromagnetic repulsion. While attractive for not requiring the application of chemicals (with the attendant environmental and health concerns), electrical and mechanical methods may not be effective under conditions of excessive icing or snowfall. In addition, these methods may require the availability of a large power supply (which is not always practical) or a large-volume airport/airbase.

Chemical methods traditionally have included the application of compositions of solid salts or liquid solutions which melt or inhibit the formation of ice. Known chemical anti-icing products rely on compounds like glycols (e.g., ethylene, propylene, diethylene, alkylene), urea, calcium magnesium acetate (CMA), sodium formate, and potassium acetate. While chemical methods overcome many of the difficulties inherent in mechanical or electrical anti-icing methods, their use has certain other disadvantages. Notably, chemical compositions may create safety and health problems, may be of limited effectiveness, may cause environmental harm, may physically or chemically damage the runway/vehicle, and/or may not be cost-effective.

In recent years, public concern and attention to groundwater and waterways pollution has increased. One source of such pollution is the anti-icing compositions used to prevent or remove ice build-up from aircraft and runways.

Chemical anti-icers of the type used until now may contribute to environmental degradation. Glycols, in particular, are environmentally problematical and their use as aircraft anti-icers is scrutinized under the Clean Water Act. Some like ethylene glycol, long used by the Air Force as an anti-icer, are toxic. Others, like propylene glycol, create environmental problems.

The degree to which a chemical creates Biochemical Oxygen Demand ("BOD") in the environment denotes that chemical's environmental toxicity. Specifically, BOD is a measure of "the amount of dissolved oxygen required to meet the metabolic needs of aerobic microorganisms in water rich in organic matter, such as sewage." *McGraw-Hill Dictionary of Scientific and Technical Terms*, p.215 (Sybil Parker, ed., 4th ed. 1989). That is, a composition that creates a high BOD fosters the growth of (potentially harmful) microorganisms in the environment while depleting available oxygen. Likewise, a composition which creates a high BOD rate fosters a faster rate of growth of (potentially harmful) microorganisms and oxygen depletion. As used herein, compositions are described as "having" a high BOD or a high BOD rate.

Ideal anti-icing compositions for use on aircraft or runways possess: (i) high freezing point depression ("FPD"); (ii) low Biochemical Oxygen Demand("BOD"); (iii) low solution conductivity; (iv) a high viscosity; (v) low toxicity; and (vi) low corrosivity.

Complicating matters is the fact that these qualities vary based on numerous interacting chemical and physical properties. It is not predictable as to which combinations will yield the best results. For example, while a large FPD is desired, a high solution conductivity is not. Increasing the non-potassium salt content increases both the FPD and the solution conductivity. Therefore, concentrations of the various components of the present invention had to be optimized to reach the desired properties.

Glycols currently used as anti-icers have a high BOD, can be toxic to aquatic organisms, and can lead to eutrophication of waterways. In addition to high BOD, glycols can cause rapid oxygen depletion in water (oxygen "crashes") after a longer enzymatic assimilation period than glycerol, for example. This longer assimilation period allows the glycols to reach waterways and stagnant bodies of water before crashing the oxygen. Certain glycols used as anti-icers have longer assimilation periods because they are uncommon or not found in nature, and the microbes which decompose them require an enzymatic adaptation period.

In contrast, some chemical anti-icing compositions employ alkali organic salts like potassium acetate. While these compositions have a reasonably low BOD, they have other serious drawbacks. For example, their electrical conductivity facilitates certain electrochemical reactions, which can corrode metals (e.g., steel, copper, aluminum, magnesium) and metal alloys commonly used in aircraft. As a result, these compositions may have practical use as runway or pavement anti-icers, but are unacceptable for direct aircraft anti-icing.

A gelatinous composition using glycols or glycerol has been shown to be useful to prevent ice-build-up on aircraft wings. See, for example, U.S. Pat. No. 2,101,472. In addition, the gelatinous composition described in U.S. Pat. No. 2,373,727 contains glycol and/or glycerol and other organic compounds. Neither patent expressed a preference for glycerol for the purpose of addressing the environmental problem of high BOD. In fact, the organic compounds of the latter patent may exacerbate the BOD problem where the solution is not completely oxygenated. Because the organic compounds lower the flashpoint, safety concerns also are increased. Moreover, neither composition comprehends the use of a fluidized glycerol/water solution having low molecular weight salts.

U.S. Pat. No. 3,362,910 describes an automotive radiator antifreeze composition containing water, glycol or glycerol, corrosion inhibitors—alkali metal silicates, a mercaptan, sodium tetraborate, and an alkali carbonate or hydroxide. No suggestion is found for choosing glycerol or other low-carbon percentage compounds to reduce BOD. Likewise, conductivity and corrosion problems associated with placing solutions containing alkali metals in contact with metals are not addressed. Importantly, this composition does not have the higher viscosity required (thereby yielding better adhesion) for anti-icing applications.

U.S. Pat. Nos. 4,117,214; 4,163,079 and 4,439,337 teach ice-inhibiting compositions containing (i) polyhydroxy or monoalkyl ethers and (ii) water soluble, non-volatile organic compound(s). The composition of U.S. Pat. No. 4,117,214 reduces the strength of ice. Dilute aqueous solutions (0.3%–5.0%) which freeze weakly are used. The composition does not melt ice or prevent ice formation, nor does it provide for a freezing point depression of water of 20° C. or greater.

The composition of U.S. Pat. No. 4,163,079 reduces the slippage of particulates on conveyor belts, the belts requiring periodic retreatment. Specifically, the composition is added in dilute concentration to reduce the compression strength of ice. The water soluble, non-volatile organic compound contains a hydrophilic group like an amine, carboxyl, or carboxylate group or polydimethyl siloxane. This composition contributes to the environmental problems previously-mentioned. The amines and other nitrogen groups contribute to eutrophication of waterways, and glycol causes BOD problems.

The composition of the U.S. Pat. No. 4,439,337 prevents particulate matters and surfaces from freezing together by reduction of ice compression strength. The composition contains polyhydroxy compounds, a single non-volatile organic compound with a hydrophilic group, an optional inorganic halide salt to depress the freezing point of water and an organic polymer thickener to adjust the viscosity. This composition also contributes to the same environmental problems discussed above. Ethylene glycol is the preferred polyhydroxy compound, notwithstanding its toxicity. Minimizing BOD is not addressed. Furthermore, the salts employed to lower the freezing point are corrosive to metals and, consequently, unsuitable for treating most aircraft surfaces or for use in other heat transfer applications potentially used for sub-zero temperatures such as an automotive radiator.

The glycerol foam of WO 87/04450 is provided as an anti-icing agent. This composition employs alkali salts of fatty acids (long-chain, high molecular weight organic compounds) and amines/amides. Again, this composition ignores the environmental problems resulting from the use of amines/amides and from not minimizing the BOD.

The anti-icing composition of WO 96/23043 contains: (i) water, (ii) a polyhydric alcohol, (iii) an organic thickener, and (iv) other additives. This composition is addressed to the field of "aqueous, non-electrolytic solutions" and not to dissociating, water-soluble salts. While glycerol is a polyhydric alcohol, this composition does not comprehend or address the rheological (i.e., viscosity) and environmental advantages of glycerol over glycol. This composition is burdened with the same environmental and effectiveness problems discussed above.

To summarize, the disadvantages of the background art are that currently available compositions for preventing ice-build-up: (i) damage the environment; (ii) are not effective at lower temperatures; (iii) are not sufficiently versatile; (iv) cause health or safety problems; (iv) damage the treated surfaces; and/or are (v) not cost-effective.

In short, there are a number of problems with the currently available anti-icing compositions. Damage to the environment is caused by (i) chemical components which, like glycol, have high BOD or high BOD rates and/or damage soil and waterways, and (ii) nitrogen-bearing compounds like amines or amides which lead to eutrophication of waterways. Some compositions simply are not effective at lower temperatures (e.g., cannot depress the freezing point 20° C. or greater). Other compositions merely weaken ice formation or compression and are less useful for preventing or removing ice build-up. Still other compositions do not have the proper viscosity necessary for aircraft and/or roadway application. Certain compositions described are toxic, while others are dangerous because of lower flashpoints. Some are corrosive to metals and/or other aircraft materials or have high solution conductivity, limiting their utility. Of course, cost concerns minimize the utility of certain compositions.

It is, therefore, a primary object of the present invention to overcome these disadvantages by providing an anti-icing composition and a method for its use.

A further object is to provide a composition which contains no glycols or polymers thereof. A related object is to provide a composition which minimizes BOD and the rate of BOD. An additional object is to provide a composition which has a freezing point depression of 20° C. or greater.

Another object is to provide a composition which allows a range of viscosities without requiring additional thickener additives, and to provide a composition which has a higher flashpoint than glycol-based compositions.

An important object is to provide a composition which maximizes the freezing point depression while minimizing the corrosivity, solution conductivity, BOD and rate of BOD. A related object is to provide a composition which will not cause eutrophication of waterways. A related object is to provide a composition which provides for more rapid environmental assimilation.

These and other objects of the invention will become apparent in the description of the preferred embodiments below.

DETAILED DESCRIPTION OF THE INVENTION

We have invented an anti-icing formulation based on glycerol and related polyhydric alcohols (collectively "polyhydric alcohols") that offers significant advantages over glycol-based solutions. Polyhydric alcohol compositions are environmentally advantageous because they biodegrade more quickly and chemically assimilate more quickly into the environment than glycol-based compositions. In addition, glycerol compositions can offer performance advantages over glycol-based compositions. For example, a glycerol composition of the present invention features low solution conductivity and a lower freezing point depression.

Moreover, the compositions described herein could equally be used as heat transfer fluids in systems which potentially could be used at sub-zero temperatures. For example, the automotive industry has used glycol-based radiator fluids for several decades, and the compositions of this invention could be used as replacements for these fluids.

Individual properties of numerous compounds were tested. Those having the lowest molecular weight, highest number of independent ionic particles per molecule, highest solubility in water, highest FPD, lowest percentage of carbon in the molecule, lowest toxicity, and/or lowest solution conductivity were formulated.

Some of the direct effects of these variables on the maximal theoretical FPD can be illustrated by the following equation for the freezing point depression in water:

$$FPD\ (°C.) = 1853\ (Sj/M_{solute}) \quad (1)$$

where

FPD is the freezing point depression, 1853 is cryoscopic constant for water,

M is the molecular weight of solute,

S is the solubility of solute in water, j is the number of independent particles or ions per molecule.

According to Equation (1), FPD is a colligative property of solutions because it is based, in part, on the number of independent particles or ions per molecule. Insofar as the compositions of the present invention comprise water soluble components with S typically greater than about 5% by weight at room temperature, the most useful of these compositions are characterized by large j and small $M_{solute}$. Another important feature is the synergism created between the polyhydric alcohol, e.g. glycerol, and the low molecular weight, low carbon percentage, non-potassium, non-halide organic and inorganic salts.

The cryoscopic constant for water is low compared to pure organic fluids that may have constants two to four times larger. When the solvent is a glycerol-water solution, the cryoscopic constant will be increased, magnifying the FPD of a particular solute relative to the value for the solute in water. This effect can be purposefully taken advantage of to develop more effective anti-icing compositions containing glycerol or other highly oxygenated polyhydric alcohols with low molecular weight, non-potassium, non-halide, low carbon percentage solutes.

A low value for the percentage of carbon in a composition component (a molecule) is usually indicative of low BOD since the composition component is highly oxidized and demands little in the way of further oxidation of the carbon, nitrogen, hydrogen or other atoms in the molecule.

Thus, two preferred characteristics of compounds taught by this invention to reduce BOD and increase FPD are low molecular weight and high oxygen percentage (or low carbon percentage) in the molecule.

One polyhydric alcohol found particularly useful in this invention is glycerol. Glycerol, like propylene glycol, is a polyhydric alcohol. There is an important distinction, however, in that the percentage of carbon in the glycerol molecule is 39.1% compared to 47.4% for propylene glycol. Propylene glycol has 21% more carbon than glycerol. Correspondingly, the BOD for glycerol is much lower than for propylene glycol. Table 1 compares the percent carbon for various compounds used in the formulations of this invention relative to glycols.

Other favorable characteristics of polyhydric alcohols such as glycerol include (i) high FPD, (ii) low cost, (iii) low corrosivity toward aircraft materials, and (iv) low solution conductivity.

The viscosity of glycerol compositions may be varied by varying the concentration of glycerol. A proper viscosity is required to facilitate adhesion on aircraft wings under shear. Viscosities of glycerol solutions range from about 3.6 centipoise (cP) for a 40 wt. % solution, to 11, 60, and 1500 cP for 60, 80, and 100 wt. % solutions, respectively.

Glycerol has a low solution conductivity and a range of viscosities useful for anti-icing applications and also useful for heat transfer applications such as automotive radiators. An aqueous solution of glycerol alone is, however, only a marginally-useful FPD. For example, the FPD for a 50 wt. % solution of glycerol is 23.4° C. with a conductivity of 2.8 milli-siemens/cm. This is substantially less than the FPD of 33.3° C. for propylene glycol or 35.9° C. for ethylene glycol. Therefore, on the basis of FPD alone, glycerol would not be the clear choice for anti-icing compositions especially where a FPD of 20° C. or greater is desired.

TABLE 1

COMPARISON OF MOLECULAR WEIGHTS AND PERCENT CARBON

| Compound | Molecular weight | Percent Carbon (organic portion) |
| --- | --- | --- |
| glycerol | 92 | 39 |
| sorbitol | 182 | 39 |
| magnesium acetate | 142 | 41 |
| ethylene carbonate | 88 | 41 |
| methanol | 32 | 38 |
| sodium formate | 68 | 27 |
| sodium tetraborate | 201 | 0 |
| propylene glycol | 62 | 47 |
| diethylene glycol | 106 | 45 |
| ethylene glycol | 76 | 32 |

In our invention, compositions containing glycerol can be, however, formulated which enhance the FPD to values competitive with propylene glycol yet retain favorably low solution conductivities, much-reduced BOD, and more rapid assimilation by the environment. Other polyhydric alcohols which are effective freezing point depressants with a low percentage of carbon may be used individually or in combination with glycerol ($C_3H_8O_3$) and include erythritol ($C_4H_{10}O_4$), pentaerythritol ($C_5H_{12}O_4$) and sorbitol, mannitol, and dulcitol (all $C6H_{14}O_6$). This family of compounds can be grouped by the formula $C_xH_yO_z$, where x is greater than 2 and less than 7, y is 2x+2, and z is x−1 or x and greater than 2.

Composition components which complement the polyhydric alcohols of the present invention include: (i) non-potassium, non-halide organic salts, e.g., magnesium acetate, sodium formate, and organic carbonates; (ii) non-potassium, non-halide inorganic salts, e.g., aluminum sulfate and sodium tetraborate; and (iii) low molecular weight monohydric alcohols, e.g., methanol and ethanol. These compounds are advantageous because they feature low molecular weight, low percentage carbon, a large number of particles per molecule, and low specific conductivity.

While potassium salts of formate, acetate and carbonate are excellent freezing point depressants, the potassium ion in a water solution has a high specific conductivity. Chlorine and other halides also produce relatively high conductivity solutions. The equivalent ionic conductance for potassium is 73.5 S-cm$^2$/equivalent; chlorine is 76.4 S-cm$^2$/eq; sodium is 50.1 S-cm$^2$/eq; magnesium is 53.1 S-cm$^2$/eq; acetate is 40.9 S-cm$^2$/eq; and formate is 54.6 S-cm$^2$/eq. The high mobility, or conductivity, of ions like potassium and chlorine in solution produces an environment conducive to corrosion.

Moreover, potassium's location in the galvanic series of metals makes potassium salts generally corrosive.

The formulations of this invention and the use of non-potassium, non-halide organic salts in polyhydric alcohol-water solutions further reduce the already-low solution conductivity resulting from the salts.

Currently preferred embodiments of the present invention have optimum overall properties from among the qualities of BOD, FPD, corrosivity, conductivity, flash point, viscosity, percent carbon and cost.

These currently preferred compositions contain the following groups:

(Group A) polyhydric alcohol(s), preferably glycerol, in aqueous solution;

(Group B) low molecular weight, non-potassium, low percentage carbon organic compounds;

(Group C) inorganic, non-potassium, non-halide salt compounds; and (Group D) monohydric alcohols.

An organic compound is considered to have a low molecular weight at about 200 units or less. An organic compound is considered to have a low carbon percentage where carbon is about 40% or less. The currently preferred low molecular weight, non-potassium, low percentage carbon organic compounds are magnesium acetate, sodium acetate, magnesium formate, and sodium formate. The currently preferred organic carbonates under Group B are ethylene carbonate, propylene carbonate, and glycerin carbonate. The currently preferred inorganic, non-potassium non-halide salt compounds are sodium tetraborate and aluminum sulfate, and the preferred monohydric alcohols are methanol and ethanol.

In addition to glycerol, currently preferred polyhydric alcohols include sorbitol, pentaerythritol and erythritol. These may be used in combination with or in lieu of glycerol, but presently are more expensive than glycerol. These polyhydric alcohols offer advantages in terms of FPDs and lower carbon percentages (by formula weight).

These compounds are members of the hydroxy-saturated family of compounds for which all, or all but one, carbon atom has an —OH group attached. Excluding ethylene glycol ($x=z=2$), this family can be represented by the formula $C_xH_yO_z$, where x is greater than 2 and less than 7, y is $2x+2$, and z is $x-1$ or x and greater than 2.

Other components may be added to the composition to serve specific functional purposes. Thus, biocides may be added to protect against microbial growth, and stabilizers, anti-oxidants, corrosion inhibitors, additional thickeners, pH adjusters, and the like may be added to serve their respective functional purpose.

The currently preferred compositions of this invention consist essentially of about 75% or less of Group A, preferably glycerol; about 25% or less from Group B; about 30% or less from Group C; and about 5% or less from Group D to maintain flashpoints within acceptable limit. In general, the preferred compositions have solution conductivities less than about 15 mS/cm; freezing point depressions of about 20° C. or more; corrosivities within the SAE-AMS specifications (Society of Automotive Engineers-Aerospace Materials Specification); 20-day BOD around 450 g oxygen per liter (or around 0.4 kg/kg solution) or less; flashpoints within SAE-AMS specifications for anti-icers and de-icers; individual component percent carbon of about 40% or less; and molecular weights of the Groups B, C, and D compounds of about 200 or less.

Properties of BOD, solution conductivity, corrosivity, density, viscosity, and FPD were measured for several preferred compositions. The following tables illustrate the advantages of these compositions compared to glycol and potassium acetate solutions, two popular anti-icing compositions.

Biochemical Oxygen Demand

Table 2 compares the BOD of a preferred composition to a 55% propylene glycol solution. In general, the preferred compositions have 20-day BOD's of approximately 450 g oxygen per liter or less. The table displays the time to reach the peak oxygen depletion rate, time to reach 50% of the asymptotic oxygen uptake, and the value for the 20-day BOD.

In Table 2 and subsequent tables, Blend A consists of 45 wt. % water, 35% glycerol, 10% magnesium acetate, 5% sodium formate, and 5% methanol. Blend B consists of 45 wt. % water, 35% glycerol, 10% magnesium acetate, 5% sodium formate, and 5% sodium tetraborate. Blend C consists of 35 wt. % water, 40% glycerol, 15% aluminum sulfate, 5% methanol, and 5% sodium tetraborate.

The "time to reach peak oxygen depletion rate" is the time at which the BOD-time curve reaches an inflection point, or equivalently, the maximum slope of the BOD-time curve. One useful relation developed for the purpose of determining the peak rate value is $$\frac{d(BOD)}{dt} = bc(BOD)\left[\left(\frac{BOD_\infty}{BOD}\right)^{1/c} - 1\right] \quad (2)$$

derived from a BOD model of $$BOD = a(1-e^{-bt})^c \quad (3)$$

| where | BOD | is Biochemical Oxygen Demand in grams oxygen per liter; |
|---|---|---|
| | $BOD_\infty$ | is the asymptotic, ultimate BOD for the solution at infinite time, |
| | t | is time; and |
| | a, b, c | are curve fit constants. The constant 'C' represents a measure of the lag required for the naturally occurring microbes to begin assimilation of the compound. |

This lag effect becomes appreciable for synthetic chemicals, or chemicals not considered to be naturally occurring in cells. In particular, propylene glycol has a much larger inception lag than glycerol, as illustrated below and in Table 2. The time to reach the peak oxygen depletion rate per Equation (2), i.e., the inflection point, is mathematically equal to $Log_e(c)/b$.

This parameter is important because larger values increase the likelihood that the compound or solution will reach local waterways before they are degraded.

TABLE 2

COMPARISON OF BOD TO 55% PROPYLENE GLYCOL & 50% POTASSIUM ACETATE

| Solution | time to reach peak oxygen depletion rate (days) | time to reach 50% of ultimate BOD (days) | 20-day BOD in grams oxygen/L (or kg oxygen/kg solution) |
|---|---|---|---|
| BLEND A | 1.5 | 2.2 | 435 (0.38) |
| BLEND B | 1.4 | 2.5 | 360 (0.31) |
| BLEND C | 3.1 | 3.4 | 465 (0.38) |
| propylene glycol | 3.9 | 4.2 | 651 (0.63) |

TABLE 2-continued

COMPARISON OF BOD TO 55% PROPYLENE GLYCOL & 50% POTASSIUM ACETATE

| Solution | time to reach peak oxygen depletion rate (days) | time to reach 50% of ultimate BOD (days) | 20-day BOD in grams oxygen/L (or kg oxygen/kg solution) |
|---|---|---|---|
| potassium: acetate | — | — | 300 (0.23) |

Conductivity

Anti-icing compositions should have minimal conductivity. In addition to damaging or interfering with electronic equipment, high electrical conductivity facilitates electrochemical reactions which lead to corrosion.

Table 3 illustrates the high solution conductivity of potassium acetate and the relatively low values for our compositions (approximately 6–7 times lower).

Comparing CMA(20%) to Blend 8 (also 20% CMA by weight) also illustrates the effectiveness of blending glycerol with the conductive salt calcium-magnesium-acetate. The conductivity drops by more than a factor of 3 in the glycerol/water solution of Blend 8. Our compositions have lower conductivity than a comparable anti-icing solution comprised of a salt-solution and offer an increased FPD. In general, the solutions of the present invention have conductivities of approximately 15 mS/cm or less.

Table 3 compares the conductivity (in mS/cm) of several compositions of our invention with a 55% propylene glycol, 50% potassium acetate, and a 20% calcium-magnesium-acetate (CMA) solution. Blend 3 is a composition of 50 wt. % water, 35% glycerol, 5% magnesium acetate, 5% methanol, and 5% CMA. Blend 10 is a composition of 50 wt. % water, 15% glycerol, 30% magnesium acetate, and 5% methanol. Blend 8 is a composition of 50 wt. % water, 30% glycerol, and 20% CMA. Blend GH is a composition of 58 wt. % glycerol, 10% water, 16% magnesium acetate, 8% sodium tetraborate, and 8% sodium formate. Blend BS is a composition of 45 wt. % water, 35% sorbitol, 10% magnesium acetate, 5% sodium formate, and 5% sodium tetraborate. Blend EC is a composition of 45 wt. % water, 35% glycerol, 10% magnesium acetate, 5% sodium formate, and 5% ethylene carbonate.

We have found further decreases in conductivity as the glycerol content is increased to around 75% in various combinations with the other compounds of this invention.

TABLE 3

COMPARISON OF CONDUCTIVITY TO PROPYLENE GLYCOL & POTASSIUM ACETATE

| Solution | Conductivity (mS/cm) |
|---|---|
| BLEND A | 13.9 |
| BLEND B | 15.5 |
| BLEND C | 3.9 |
| BLEND GH | 0.6 |
| BLEND BS | 9.7 |
| BLEND EC | 11.7 |
| BLEND 3 | 8.2 |
| BLEND 10 | 9.4 |
| BLEND 8 | 10.0 |
| potassium acetate | 98.4 |
| CMA (20%) | 32.0 |
| propylene glycol | 0.5 |

Freezing Point Depression

Freezing point depression is a direct indicator of composition effectiveness. The compositions of the invention meet or exceed the freezing point depressions of propylene glycol.

Table 4 compares the FPD for several solutions taught by this invention with that for a 50% by weight propylene glycol solution. The solutions of this invention generally have FPD's greater than 200° C.

The concentrations of polyhydric alcohols may be altered to affect the freezing point depression and viscosity. For example, the freezing point depression will generally increase by about 0.75° C. per each weight percentage point increase of glycerol.

TABLE 4

COMPARISON OF FPD TO PROPYLENE GLYCOL & POTASSIUM ACETATE

| Solution | FPD (°C.) |
|---|---|
| BLEND A | 35.7 |
| BLEND B | 30.9 |
| BLEND C | >55 |
| BLEND GH | >30 |
| BLEND BS | 18.0 |
| BLEND EC | 30.5 |
| BLEND 3 | 22.0 |
| BLEND 10 | 30.0 |
| BLEND 8 | 25.0 |
| potassium acetate (50%) | 60.0 |
| ethylene glycol (50%) | 35.9 |
| propylene glycol (50%) | 33.3 |

Viscosity

Another property tied to the performance of the composition is viscosity. Glycerol and other polyhydric alcohols are important ingredients because they can be used to thicken solutions, i.e., increase the viscosity. Depending on the amount of glycerol and other viscosity-affecting compounds in the composition, the viscosity can range from about 1 cP up to about 1000 cP. Typical viscosities are around 100 cP for glycerol concentrations of approximately 75%, depending on the other components in the solution which will also affect the viscosity. The range of viscosities available with this composition allows for versatile application with our invention.

Toxicity

The toxicity of an anti-icing composition is another important consideration. Glycerol, sorbitol and other polyhydric alcohols of the present invention are relatively non-toxic with respect to human ingestion. In comparison, ethylene glycol, once widely used as antifreeze, has a high toxicity (low LD50). It's replacement, propylene glycol is relatively non-toxic to humans, but is environmentally harmful. Certain additives used in anti-icing compositions as thickeners, surfactants, corrosion inhibitors, and the like, are toxic and/or render the ultimate composition toxic.

Table 5 compares the "lethal-dose-50" (LD50) of rats for polyhydric alcohols.

TABLE 5

COMPARISON OF TOXICITY OF POLYHYDRIC ALCOHOLS

| Compound | LD50, Rat (g/kg) |
|---|---|
| glycerol | >25 |
| sorbitol | 16 |

TABLE 5-continued

COMPARISON OF TOXICITY OF POLYHYDRIC ALCOHOLS

| Compound | LD50, Rat (g/kg) |
|---|---|
| propylene glycol | 26 |
| ethylene glycol | 5–8 |

Corrosivity

The corrosivity of an anti-icing composition determines its utility for, among other things, aircraft surfaces.

Tables 6 and 7 compare the corrosivity of example blends of the present invention with potassium acetate and propylene glycol. The measurements were carried out per ASTM (American Society for Testing and Materials) method F 483 (referenced in SAE-AMS 1424A) and ASTM method G31.

Table 6 shows that typical compositions of our invention, Blends A and B. are relatively less corrosive than the potassium acetate solutions, where Al and Ti alloys exceed or border on the AMS 1424A specification ("AMS 1424A spec" row in Table 6) for aircraft anti-icers. These compositions compare favorably to propylene glycol.

TABLE 6

COMPARISON OF CORROSION DATA: WEIGHT CHANGE IN 24 HOURS IN MILLIGRAMS PER SQUARE CENTIMETER PER ASTM METHOD F 483

| Solution | AMS 4041 (Al alloy) | AMS 4911 (Ti alloy) | AMS 5045 (carbon-steel) | Alloy CDA 172 (copper) |
|---|---|---|---|---|
| AMS 1424A spec | ≦0.3 | ≦0.1 | ≦0.8 | n/a |
| BLEND A | −0.1 | 0.06 | 0.0 | 0.03 |
| BLEND B | −0.2 | 0.06 | −0.6 | −0.09 |
| potassium acetate (50%) | −0.3 | 0.13 | −0.2 | 0.13 |
| propylene glycol (55%) | −0.2 | −0.06 | −0.1 | 0.09 |

Table 7 shows the corrosion data over a period of 7 days, demonstrating that blends of our invention are well within corrosion limits (proportionally rated from the 24 hr AMS 1424A specifications). Compare to potassium acetate solutions which produce some of the highest corrosion rates.

TABLE 7

COMPARISON OF CORROSION DATA: WEIGHT CHANGE IN 7 DAYS IN MILS-PER-YEAR PER ASTM G31

| Solution | AMS 4041 (Al alloy) | AMS 4911 (Ti alloy) | AMS 5045 (carbon-steel) | Alloy CDA 172 (copper) |
|---|---|---|---|---|
| AMS 1424A spec | ≦15.6 | ≦3.2 | ≦14.6 | n/a |
| BLEND A | 0.0 | 0.2 | −0.3 | −0.2 |
| BLEND B | −1.0 | 0.8 | −2.5 | −0.5 |
| potassium acetate (50%) | −1.7 | 0.7 | −5.7 | −0.5 |
| propylene glycol (55%) | −1.0 | −0.1 | 0.1 | 0.0 |

Corrosivity is also an important parameter for the design and materials of construction of heat exchangers (e.g., automotive radiators) which are generally constructed of aluminum, copper or steel.

Safety

The fire hazard associated by anti-icing compositions is a major concern. The compositions of the present invention, based on glycerol and higher order polyhydric alcohols, pose less danger of explosion relative to glycol-based compositions. The flashpoints of propylene glycol and ethylene glycol are 99° C. and 116° C. respectively, while the flashpoints of glycerol, pentaerythritol and sorbitol are 160° C., 260° C. and 385° C. respectively. Current SAE-AMS 1435 aircraft de-icing and anti-icing fluid specifications call for flashpoints of 100° C. or greater.

The flashpoint for a given composition depends on the flashpoints of the components. For example, the presence of volatile organic compounds will lower the flashpoint of a composition. On the other hand, the organic salt components of the present invention do not appreciably affect the composition flashpoint. However, the presence of monohydric alcohols methanol or ethanol in our invention will lower the flashpoint.

As an illustration, the flashpoint of BLEND B was measured per ASTM D93 to be 220° C. Compared with the flashpoint of pure glycerol (160° C.), this composition is significantly safer.

Although the present invention has been described in connection with the preferred embodiments thereof, it will be appreciated by those skilled in the art that modifications, substitutions, additions and deletions not specifically described, may be made without departing from the spirit and the scope of the invention as defined in the appended claims.

What is claimed is:

1. An anti-icing composition, comprising:
   (a) at least one polyhydric alcohol selected from the group consisting of glycerol, sorbitol, mannitol, erythritol, pentaerythritol and dulcitol;
   (b) 5 to about 25 wt. % of at least one non-potassium, non-nitrogen organic compound having a molecular weight less than about 201 atomic mass units and a carbon percentage less than about 40% by weight; and
   (c) at least one non-potassium, non-halide inorganic compound.

2. The composition of claim 1, further comprising a monohydric alcohol.

3. The composition of claim 1, wherein the at least one non-potassium, non-nitrogen organic compound is selected from the group consisting of magnesium acetate, sodium acetate, magnesium formate, sodium formate, ethylene carbonate, propylene carbonate and glycerin carbonate.

4. The composition of claim 1, wherein the composition further comprises at least one member selected from the group consisting of a biocide, a stabilizer, an anti-oxidant, a corrosion inhibitor, a thickener, and a pH adjuster.

5. The composition of claim 2, wherein the at least one non-potassium, non-halide inorganic compound is selected from the group consisting of sodium tetraborate and aluminum sulfate, and the monohydric alcohol is selected from the group consisting of ethanol and methanol.

6. The composition of claim 1, wherein the composition has a conductivity of less than about 15 mS/cm.

7. The composition of claim 1, wherein the composition has a flashpoint greater than about 160° C.

8. The composition of claim 1, wherein the composition has a 20-day BOD less than about 0.4 kg oxygen/kg solution.

9. The composition of claim 1, wherein the composition has a peak oxygen depletion rate occurring in less than about 3 days.

10. The composition of claim 1, wherein the composition has a freezing point depression of at least 20° C.

11. The composition of claim 2, wherein the composition has a freezing point depression of at least 20° C.

12. An anti-icing composition according to claim 1, wherein said inorganic compound is a non-nitrogen inorganic compound.

13. An anti-icing composition, comprising:
(a) at least one polyhydric alcohol having the formula $C_xH_yO_z$, where $2<x<7$, $y=2x+2$, and $z=x$ or $z=x-1$ and $z>2$;
(b) 5 to about 25 wt. % of at least one non-potassium, non-nitrogen organic compound having a molecular weight less than about 201 atomic mass units and a carbon percentage less than about 40% by weight; and
(c) at least one non-potassium, non-halide inorganic compound.

14. An anti-icing method comprising the step of applying to a surface a composition, comprising:
(a) at least one polyhydric alcohol selected from the group consisting of glycerol, sorbitol, mannitol, erythritol, pentaerythritol and dulcitol;
(b) 5 to about 25 wt. % of at least one non-potassium, non-nitrogen organic compound having a molecular weight less than about 201 atomic mass units and a molecular carbon percentage less than about 40% by weight; and
(c) at least one non-potassium, non-halide inorganic compound.

15. The method of claim 14, wherein the composition further comprises a monohydric alcohol.

16. The method of claim 14, wherein the non-potassium, non-nitrogen organic compound is selected from the group consisting of magnesium acetate, sodium acetate, magnesium formate, sodium formate, ethylene carbonate, propylene carbonate and glycerin carbonate.

17. The method of claim 14, wherein the composition further comprises at least one member selected from the group consisting of a biocide, a stabilizer, an anti-oxidant, a corrosion inhibitor, a thickener, and a pH adjuster.

18. The method of claim 15, wherein the non-potassium, non-halide inorganic compound is selected from the group consisting of sodium tetraborate and aluminum sulfate, and where the monohydric alcohol is selected from the group consisting of ethanol and methanol.

19. The method of claim 14, wherein the composition has a conductivity of less than about 15 mS/cm.

20. The method of claim 14, wherein the composition has a flashpoint greater than about 160° C.

21. The method of claim 14, wherein the composition has a 20-day BOD of less than about 0.4 kg oxygen/kg solution.

22. The method of claim 14, wherein the composition has a peak oxygen depletion rate occurring in less than about 3 days.

23. The method of claim 14, wherein the composition has a freezing point depression of at least 20° C.

24. The method of claim 15, wherein the composition has a freezing point depression of at least 20° C.

25. The method of claim 16, wherein the composition has a freezing point depression of at least 20° C.

26. The method of claim 17, wherein the composition has a freezing point depression of at least 20° C.

27. The method of claim 18, wherein the composition has a freezing point depression of at least 20° C.

28. The method of claim 14, wherein the surface is selected from the group consisting of vehicle surfaces, aircraft surfaces, airfields and roadways.

29. The method of claim 14, wherein the surface has a surface temperature of lower than about −20° C.

30. An anti-icing method comprising applying a composition to a surface, said composition comprising:
(a) 15 to about 75% by weight of at least one polyhydric alcohol selected from the group consisting of glycerol, sorbitol, mannitol, erythritol, pentaerythritol and dulcitol;
(b) 5 to about 25% by weight of at least one non-potassium, non-nitrogen organic compound having a molecular weight less than about 201 atomic mass units and a molecular carbon percentage less than about 40% by weight;
(c) 5 to about 30% by weight of at least one non-potassium, non-halide inorganic compound; and
(d) zero to approximately 5% by weight of at least one monohydric alcohol.

31. An anti-icing method comprising the step of applying to a surface a composition, comprising:
(a) 15 to about 75% by weight of glycerol;
(b) at least one compound selected from the group consisting of sodium acetate, sodium formate, magnesium acetate, magnesium formate and organic carbonates;
(c) at least one compound selected from the group consisting of aluminum sulfate and sodium tetraborate; and
(d) zero to approximately 5% by weight of ethanol or methanol.

32. An anti-icing method according to claim 31, wherein (b) is present in an amount of 5 to 25% by weight and (c) is present in an amount of 5 to 30% by weight.

33. A heat transfer method comprising:
introducing a composition into a system and utilizing the composition to exchange heat in the system, wherein the composition comprises:
(a) at least one polyhydric alcohol selected from the group consisting of glycerol, sorbitol, mannitol, erythritol, pentaerythritol and dulcitol; and
(b) at least one non-potassium, non-nitrogen organic compound having a molecular weight less than about 201 atomic mass units and a molecular carbon percentage less than about 40% by weight.

* * * * *